UNITED STATES PATENT OFFICE.

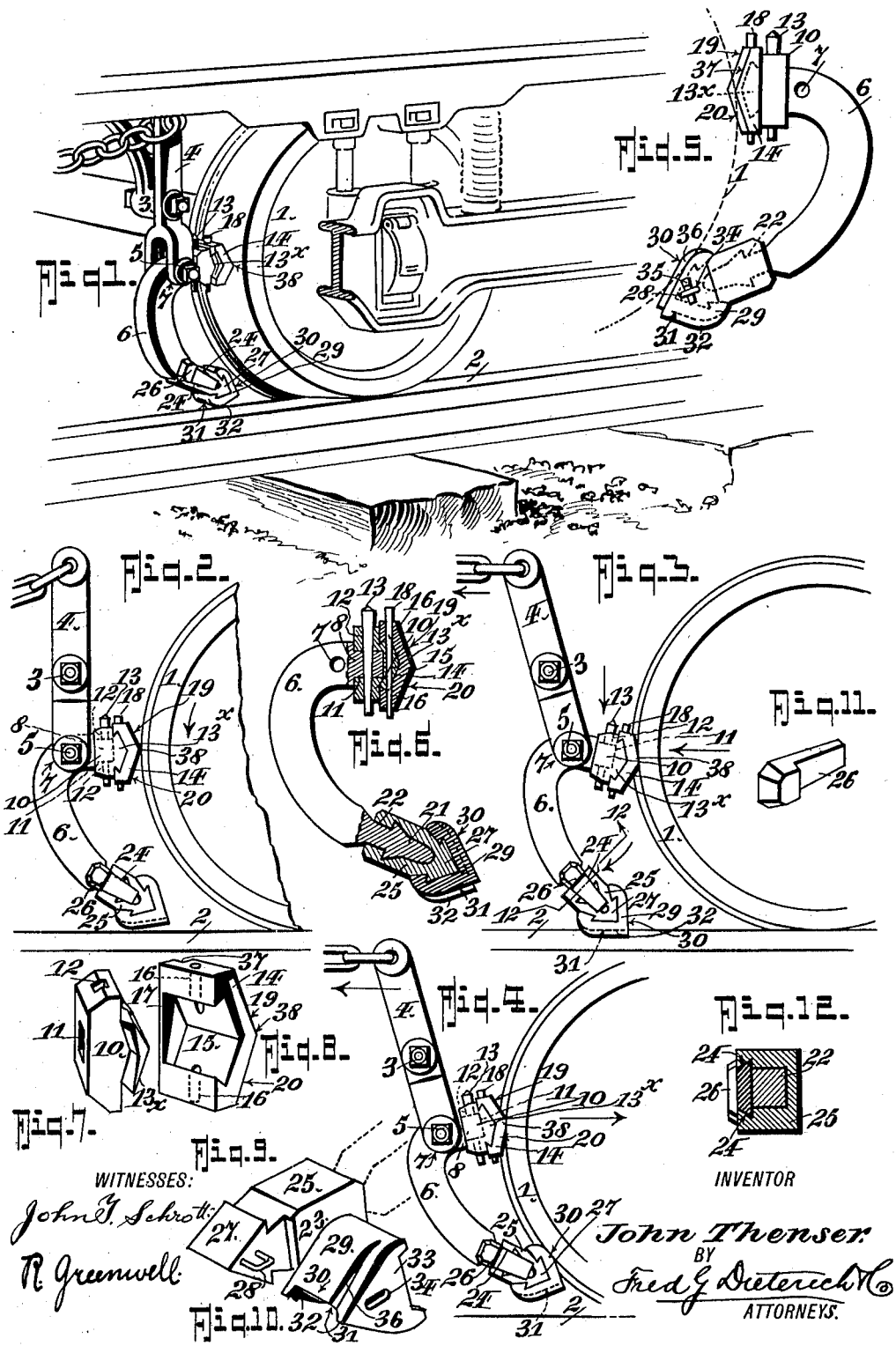

JOHN THENSER, OF CARIBOU, MAINE.

CAR-BRAKE.

1,035,918.     Specification of Letters Patent.     Patented Aug. 20, 1912.

Application filed March 13, 1912. Serial No. 683,440.

*To all whom it may concern:*

Be it known that I, JOHN THENSER, residing at Caribou, in the county of Aroostook and State of Maine, have invented certain new and useful Improvements in Car-Brakes, of which the following is a specification.

My invention is a combined wheel and track brake for railway vehicles and in its generic nature the invention includes a brake lever of the bell crank type which carries a brake shoe at each end, the lever being so mounted that when swung toward the car wheel to bring one of the brake shoes in contact therewith, and when the car wheel is turning in the forward direction its power will be applied to the brake lever to cause the lower shoe to act against the rail as a brake and conversely when the wheel is turning backward, the force of the wheel's movement will be imparted to the brake lever to bring both brake shoes into contact with the wheel itself. The brake shoe carrying lever is so mounted on the hanger that when in the normal position, neither brake shoe will engage the wheel or the track.

The invention also includes those novel details of construction, combination and arrangement of parts, all of which will be first fully described, then be specifically pointed out in the appended claims, reference being had to the accompanying drawing, in which:—

Figure 1 is a perspective view illustrating the invention and showing the position of the parts when in the normal running position. Fig. 2 is a detail side elevation of the same. Fig. 3 is a detail side elevation showing the manner of operation of the invention when the brake is applied to a forwardly turning wheel. Fig. 4 is a view similar to Fig. 3 illustrating the position of the parts when the brake is applied to a rearwardly turning wheel. Fig. 5 is a side elevation of the parts shown in Fig. 4, taken from the opposite side. Fig. 6 is a side elevation and part central longitudinal section of the device. Figs. 7 and 8 are detail perspective views of the upper brake shoe carrier and the upper brake shoe, respectively. Figs. 9 and 10 are detail perspective views of the lower brake shoe carrier and the lower brake shoe, respectively. Fig. 11 is a detail perspective view of the key 26, and Fig. 12 is a detail cross section on the line 12—12 of Fig. 3.

Referring now to the drawing in which like numerals and letters of reference indicate like parts in all the figures, 1 designates the car wheel, 2 the rail, 3 the support on which the brake hanger 4 is pivoted.

6 designates the bell crank lever which forms a part of the invention.

The lever 6 is pivoted at 7 adjacent to the upper brake shoe and so that the bell crank lever 6 may have a long arm and a short arm.

5 designates the pivot bolt that passes through the pivot hole 7, of the lever 6, and through the bifurcated lower end of the hanger lever 4.

The short arm of the bell crank lever 6 is reduced at 8 to fit into the socket 11 of the upper brake shoe carrier 10, which carrier 10 is secured to the reduced portion 8 by a key pin 13 that passes through an opening 12 provided for the same. The brake shoe carrier 10 has a dove-tail forwardly projecting portion 13ˣ that fits into the dove-tail pocket 15 of the upper brake shoe 14, the pocket 15 not extending entirely through the shoe 14 but terminating short of one side to leave a web 17. The upper brake shoe 14 is secured to the carrier 10 by a pin 18 which passes through holes 16, provided for the purpose. The brake shoe 14 has two braking surfaces, 19 and 20, which converge toward one another as is clearly indicated in the drawing. The side of the shoe 14 adjacent to the flange of the wheel is grooved at 37, to permit the wheel flange to project into the same.

The lower or long arm of the bell crank lever 6, is reduced at 22 and formed with a spear head 21 to receive the lower brake shoe carrier 25 which is secured in place by a key 26 that fits a dove-tail slot 24 in one side face of the carrier 25. The passage in the carrier 25 that is provided to receive the end of the arm 6 does not extend entirely through the carrier 25, but terminates short of one side to leave a web 23 at that side, as best indicated in Fig. 9 of the drawing.

The lower brake shoe carrier 25 has a spear head 27 to receive the lower brake shoe 29, which has a similarly formed pocket to receive the spear head 27, the pocket terminating short of one side of the shoe 29 to leave a web 33, which is provided with an opening 34 for the staple like member 28, that passes through the opening and receives the wedge key 35 that holds the shoe 29 on the carrier 25.

The lower brake shoe 29 also has two braking surfaces, an upper and a lower one, the upper one 30 serving to coöperate with the wheel, and the shoe 29 is provided with a groove 36 on its upper surface for the wheel flange. The lower surface 31, which engages the rail 2, is provided at its sides with downwardly projecting flanges 32, that straddle the rail 2.

The manner in which the invention operates will be clearly understood by reference to Figs. 2, 3, and 4 of the drawing. Assume the parts to be in the position shown in Fig. 2, and the wheel turning forwardly in the direction of the arrow, and assume it is desired to apply the brake, power is applied to the hanger 4 in any desired way to turn it in the direction of the arrow in Fig. 3. This brings the point or meeting edge 38 of the two brake surfaces 19 and 20, of the upper brake shoe, into contact with the wheel 1 before the lower brake shoe 29 engages the rail. This contact with the wheel causes motion to be imparted to the bell crank lever 6 to move the upper brake shoe downwardly in the direction of the arrow in Fig. 3, and the lower brake shoe downwardly and forwardly in the direction of the arrow in Fig. 3 to thereby throw the line of contact between the upper brake shoe 14 and the wheel 1 below the point of fulcrum 5 of the lever 6 and to bring the lower brake shoe 29 into engagement with the rail, thus the turning movement of the wheel 1 in the forward direction in Fig. 3 is retarded by the braking action of the upper brake shoe 14 on the wheel, and the movement of the vehicle forwardly is further retarded by the action of the lower brake shoe on the track against which it is pressed by the power applied through the brake shoes and levers 6 resulting from the turning movement of the wheel in its forward direction in connection with the force applied to the brake hanger 4 to hold the upper brake shoe in contact with the wheels.

Assume the parts to be in the position shown in Fig. 2 and the wheel turning in a backward direction, that is a direction opposite to the direction of the arrow indicated in Fig. 2. Assume further that the hanger 4 is rocked to apply the brake, as soon as the upper brake shoe 14 engages the wheel, it will be moved in a direction opposite to the arrow in Fig. 3, thus rocking the lever 6 on its fulcrum 5 to move the lower brake shoe in a direction opposite to the arrow in Fig. 3 and bring it into contact with the wheel, as indicated in Fig. 5, thus applying the braking effect wholly to the wheel instead of the wheel and rail. It will also be observed that the line of contact between the wheel and the upper brake shoe 14 when the wheel is running backwardly is in above the pivot 5, thus the turning movement of the wheel assists in forcing the lower brake shoe against the wheel.

From the foregoing description, taken in connection with the accompanying drawing, it is thought the complete construction, operation and advantages of the invention will be apparent to those skilled in the art, and I desire it understood that the invention may be used on any kind or type of railway vehicle or other vehicle running on a suitable trackway.

What I claim is:—

1. In a brake of the character stated a pair of brake shoes, a brake hanger, and means forming a support for said shoes and connecting the same to said hanger to coöperate with the wheel and cause said brake shoes to be applied one to the wheel and one to the track when the wheel is turning in one direction, and to cause both shoes to be applied to the wheel when the wheel is turning in the reverse direction.

2. In a brake of the character stated a pair of brake shoes, a brake hanger, and means forming a support for said shoes and connecting the same to said hanger to coöperate with the wheel and cause said brake shoes to be applied one to the wheel and one to the track when the wheel is turning in one direction, and to cause both shoes to be applied to the wheel when the wheel is turning in the reverse direction, said means including a bell crank brake shoe carrying lever on which said shoes are mounted, and means pivotally connecting said bell crank lever to said hanger.

3. In a car brake, the combination with the wheel and track, of a brake shoe carrying lever, a brake shoe on each end of said lever, means for supporting said lever with one brake shoe adjacent to the wheel and the other brake shoe adjacent to the track, but out of contact with the same, and means for moving said brake shoe carrying lever to move one shoe into contact with the wheel to thereby cause the wheel to move the lever to bring the other brake shoe into engagement with the track or the wheel accordingly as said wheel is turning in one direction or the other.

4. In a mechanism of the character stated, the combination with a wheel and track, of a brake shoe carrying bell crank lever, a brake shoe carrier mounted on each end of said lever, said lever including a short arm and a long arm, a brake shoe mounted on each carrier, means for supporting said lever and moving it to bring the shorter arm shoe into contact with the wheel to thereby cause said wheel to apply a force to said lever to cause said long arm shoe to engage either the rail or the wheel accordingly as said wheel is turning one way or the other.

5. In a mechanism of the character stated, the combination with a wheel and track, of a brake shoe carrying bell crank lever, a brake shoe carrier mounted on each end of said lever, said lever including a short arm and a long arm, a brake shoe mounted on each carrier, means for supporting said lever and moving it to bring the shorter arm shoe into contact with the wheel to thereby cause said wheel to apply a force to said lever to cause said long arm shoe to engage either the rail or the wheel accordingly as said wheel is turning one way or the other, each of said shoes having two converging braking faces, the shorter arm shoe also having wheel flange receiving grooves adjacent to each face.

6. In a mechanism of the character stated, the combination with a wheel and track of a brake shoe carrying bell crank lever, a brake shoe carrier mounted on each end of said lever, said lever including a short arm and a long arm, a brake shoe mounted on each carrier, means for supporting said lever and moving it to bring the shorter arm shoe into contact with the wheel to thereby cause said wheel to apply a force to said lever to cause said long arm shoe to engage either the rail or the wheel accordingly as said wheel is turning one way or the other, each of said shoes having two converging braking faces, the shorter arm shoe also having wheel flange receiving grooves adjacent to each face, said longer arm shoe including rail straddling flanges.

7. In a mechanism of the character stated, the combination with a wheel and track, of a brake shoe carrying bell crank lever, a brake shoe carrier mounted on each end of said lever, said lever including a short arm and a long arm, a brake shoe mounted on each carrier, means for supporting said lever and moving it to bring the shorter arm shoe into contact with the wheel to thereby cause said wheel to apply a force to said lever to cause said long arm shoe to engage either the rail or the wheel accordingly as said wheel is turning one way or the other, each of said shoes having two converging braking faces, said longer arm shoe including rail straddling flanges.

JOHN THENSER.

Witnesses:
 HERSHEL WALTON,
 LAURENCE A. HUTCHINSON.

Copies of this patent may be obtained for five cents each, by addressing the "Commissioner of Patents, Washington, D. C."